United States Patent [19]

Rhoades et al.

[11] Patent Number: 4,656,788

[45] Date of Patent: Apr. 14, 1987

[54] VARIABLE ORBITAL DRIVE MECHANISM

[75] Inventors: Lawrence J. Rhoades, Pittsburgh; Nicholas P. Nokovich, Greensburg, both of Pa.

[73] Assignee: Extrude Hone Corporation, Irwin, Pa.

[21] Appl. No.: 647,810

[22] Filed: Sep. 6, 1984

[51] Int. Cl.$^4$ .............................................. B24B 7/00
[52] U.S. Cl. .......................................... 51/58; 51/119; 51/55; 74/86; 74/395
[58] Field of Search ............... 51/58, 55, 284, 119, 51/120, 121, 157; 74/86, 395

[56] References Cited

U.S. PATENT DOCUMENTS

| | | | |
|---|---|---|---|
| 3,200,541 | 8/1965 | Banti | 51/119 |
| 4,277,915 | 7/1981 | Hausermann | 51/58 |
| 4,320,599 | 3/1982 | Hill et al. | 51/58 |

Primary Examiner—Frederick R. Schmidt
Assistant Examiner—Robert A. Rose
Attorney, Agent, or Firm—James S. Waldron

[57] ABSTRACT

A mechanism for imparting relative orbital motion to at least two associated driven elements. The driven elements are driven in an eccentric path, usually with a common drive axis, where the angular displacement of each such path is controlled while relative rotation of the driven elements is precluded.

10 Claims, 7 Drawing Figures

4,656,788

VARIABLE ORBITAL DRIVE MECHANISM

FIELD AND OBJECTS OF THE INVENTION

The present invention relates to drive elements and mechanisms which convert rotary input to relative orbital motion.

More particularly, it relates to the production of relative orbital motion of at least two driven elements without relative rotation.

Still more particularly it relates to relative orbital motion in which the amplitude of the orbit is variable and controllable.

It is the object of the present invention to provide a variable orbital drive mechanism for imparting relative orbital motion to at least two driven elements, while preventing relative rotation of the driven elements. A further object is to provide such a mechanism wherein the orbit amplitude is variable continuously through a fixed range of zero to some maximum, and wherein the amplitude of the orbit may be set at some predetermined value in the range or may be controllably varied in some predetermined way during operation. Still other objects include the provision of a simple, reliable and inexpensive mechanism with high levels of accuracy and reproducability suitable for the most demanding of orbital drive applications.

One common application of orbital motion is in machine tools where orbital drives are frequently employed in machining operations where a tool performs work upon a workpiece which is dependent, at least in part, upon relative orbital motion of the tool and the workpiece. While the present invention is not limited to these applications, it can most readily and completely be understood by reference to such operations. While the present invention is described and exemplified in the context of machine tools, those of ordinary skill in the art will be able, given the guidance of the instant disclosure, to readily adapt the mechanism and method of the present invention to other contexts.

BACKGROUND OF THE INVENTION

There are a wide variety of machine tools and machining operations based on relative orbital motion between a tool and a workpiece. A typical, exemplary case arises in the procedure known as total form machining, wherein an abrasive tool is formed to a shape which, with allowances for the orbital offset, conforms to the shape desired in a workpiece. The tool is slowly advanced into the workpiece while orbiting, and a machining fluid is passed substantially continuously between the tool and workpiece to facilitate the work, to remove debris, to cool the tool and workpiece, and the like. Other relative motions are prevented.

By the use of such procedures, extremely complex and even delicate shapes can be attained. Other such procedures include electrical discharge machining, electro-chemical grinding, and combinations, either sequentially or in multifunctional singular operations, of a variety of such techniques. With a proper selection of materials, tool configurations, and other variables, these procedures can produce machined shapes not attainable in any other practical way and produce a level of finish and accuracy which are exceptional.

The methods and mechanisms currently employed to produce the orbital motion of the tool in relation to the workpiece is at current one of the predominant limitations on such equipment and operations. The simplest and most reliable drives, as well as the least expensive, generally employ a fixed orbit which is not variable or controllable, and which has limited accuracy. As the orbit drive mechanisms have been made more accurate, variable and/or controllable, they have also become more complex, more expensive, more fragile, and more difficult to maintain and calibrate.

SUMMARY OF THE INVENTION

The present invention provides a simple, accurate, and controllably variable orbital drive mechanism which overcomes the foregoing problems. It is based upon driving at least two driven elements, such as a tool and a workpiece, in an eccentric path, usually with a common drive axis, where the angular displacement of each such path is controlled, and preferably variably controlled, while relative rotation is precluded.

The drive will permit or facilitate, in the preferred embodiment, advancing the driven elements toward and away from one another, as in the case of advancing a tool into a workpiece, along a path which intersects the plane of the orbits. Most often, this path will be normal to that plane. It should be understood that this feature is not an essential element of the drive per se, but rather an element of considerable import to the preferred embodiment.

DESCRIPTION OF THE DRAWINGS

FIG. 1A, the angular displacement is $\pi$, while in FIG. 1B, the angular displacement is $0.25\pi$, in radians. In an attempt to aid in understanding, FIG. 1 is a representation in three dimensions.

DETAILED DESCRIPTION OF THE INVENTION

Figure 1:
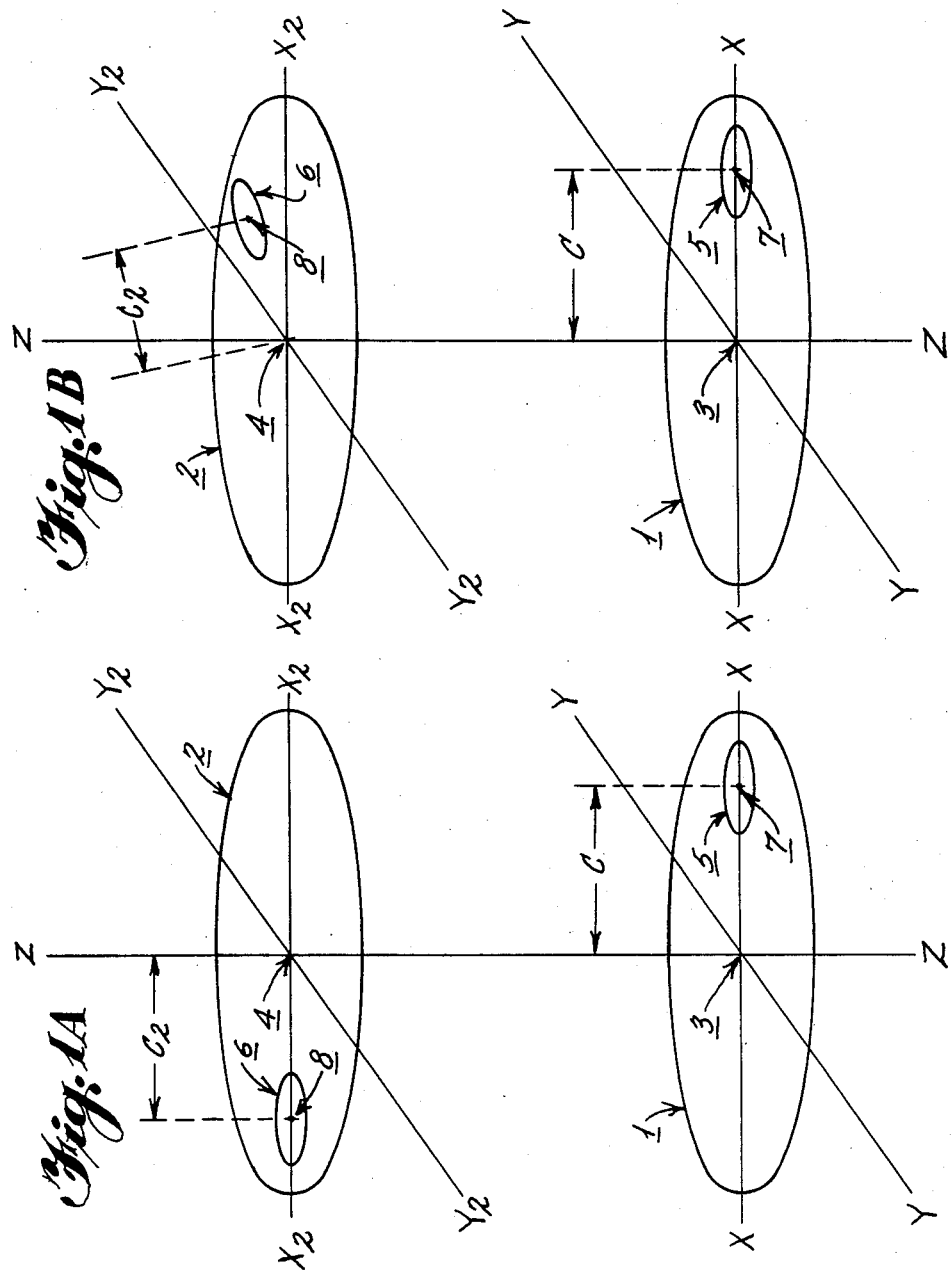
FIG. 1 is a pair of highly stylized schematic representations showing the generalized geometry of one case of different angular displacements of the axis of eccentricity.

With reference to FIG. 1, the simplest case of the present invention is illustrated geometrically with three mutually perpendicular axes X, Y and Z. Rotary drive element 1 is adapted to rotate about the Z axis in the plane X-Y, with the axis of rotation 3. Drive element 1 is provided with driven element 5 rotatably mounted thereon, having its axis of rotation 7 offset from drive axis 3 by the distance shown as dimension C.

When drive element 1 is rotated while driven element 5 is prevented from rotating in the X-Y plane, it is apparent that driven element will move in a circular orbit having a radius C.

Second drive element 2 has an axis of rotation 4 providing for rotation about the Z axis in the plane $X_2$-$Y_2$ parallel to plane X-Y, and carries driven element 6, rotatably mounted thereon with its axis of rotation 8 offset by the distance $C_2$. Normal circumstances will provide that $C=C_2$.

With the same constraint preventing rotation of driven element 6 in the $X_2$-$Y_2$ plane, rotation of drive element 2 imparts a circular orbital motion to element 6, having a radius of $C_2$.

When considered as a whole, it is apparent that if drive elements 1 and 2 are both rotated, driven elements 5 and 6 both orbit.

If the angle of the line 3–7 relative to the X axis is aligned with line 4–8 relative to the $X_2$ axis, defined herein as a relative angular displacement, d, of zero, it is apparent that, so long as that relationship is held, while both driven elements will orbit about the Z axis, the orbits will be synchronized, and if orbital radii C and $C_2$ are equal, there will be no relative motion of the driven elements.

If the relative angular displacement, d, is fixed at $\pi$ radians, the orbits will be out of synchronization to the maximum attainable extent. The driven elements 5 and 6 will have a resultant relative circular orbital motion having an orbital radius of $2C=C+C_2$.

If the relative angular displacement is greater than zero, but less than $\pi$, analysis will show a relative orbital movement of driven elements 5 and 6 having an eliptical orbital "radius" wherein $0<C_n<2C$.

The motion of every point on a driven element in relation to the coordinate system is defined by two equations:

$$X = C \sin(\theta) \quad (1)$$

$$Y = C \cos(\theta) \quad (2)$$

where the variables are as follows:
X is position in the X direction on plane X-Y;
Y is position in the Y direction on plane X-Y;
C is the eccentricity; and
$\theta$ is the angle of rotation from reference when $X=0$.

When two elements are driven in accordance with the present invention, the resultant relative differential motion is defined by two different equations:

$$X_R = C \sin(\theta) - C \sin(\theta + d) \quad (3)$$

$$Y_R = C \cos(\theta) - C \cos(\theta + d) \quad (4)$$

where the variables are as assigned above, and $X_R$ is relative locus of X
$Y_R$ is relative locus of Y
d is the relative angular displacement.

Equations (3) and (4) can be expanded as follows:

$$X_R = C \sin(\theta) - C \sin(\theta) \cos(d) - C \cos(\theta) \sin(d) \quad (5)$$

$$Y_R = C \cos(\theta) - C \cos(\theta) \cos(d) + C \sin(\theta) \sin(d) \quad (6)$$

Thus, if $d=\pi$, $\cos(d)=1$ and $\sin(d)=0$ and both $X_R$ and $Y_R$ also equal zero.

When $d=0$, $\cos(d)=-1$ and $\sin(d)=0$ and $Y_R=2C \cos(\theta)$ and $X_R=2C \sin(\theta)$. This pair of resultants defines a circle with radius 2C.

In more general terms, equations (5) and (6) define an ellipse with the major axis a direct function of the phase angle of relative displacement, d. In the case of $d=0$, the ellipse is degenerate to a point, while the case of $d=\pi$ is a special ellipse with equal major and minor axes, i.e., a circle.

When automated dynamic control of d is to be employed, it will often be useful to substitute angular velocity ($\omega t$), where $\omega$ is the frequency and t is time. This substitution permits ready control by synchronization of phase of the drive mechanisms.

It is now apparent that for a drive with an eccentric offset of C, it is possible to provide means to fix the driving elements in any selected relative angular displacement to attain fixed relative orbital association of the driven elements at any size of orbit within the range.

It is equally apparent that if, during operation, the relative angular displacement is varied, the dimensions of the orbit can be continuously varied within the range in systematic fashion. Most commonly, such controllable variation of relative angular displacement will be based on providing separate drives for the driving elements 1 and 2, which can be driven at different speeds, at least for periods of time, so that the size of the orbits is varied as a function of the relative angular velocity of each drive.

For simplicity and ease of understanding, FIG. 1 does not show any means to prevent rotation of the driven element. Any number of such means may be employed, as will be exemplified hereinafter.

For the same reason no means are shown in FIG. 1 to provide the optional, but preferred aspect of advance and retreat of the driven elements. This too is a feature discussed and exemplified infra.

Figure 2:
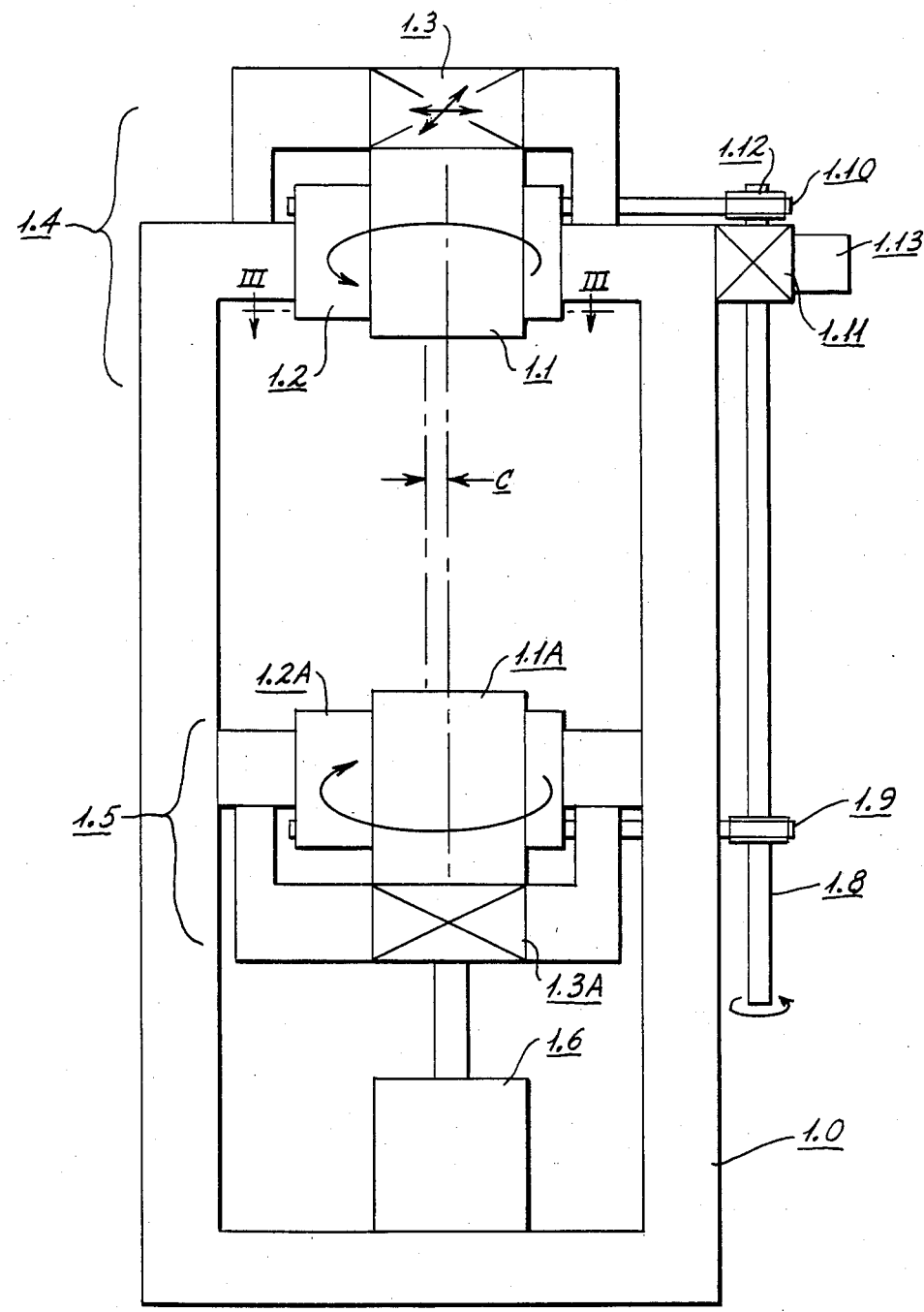
FIG. 2 is a stylized and simplified cross-sectional elevation representation of a mechanism which embodies the geometry shown in FIG. 1.
Figure 3:
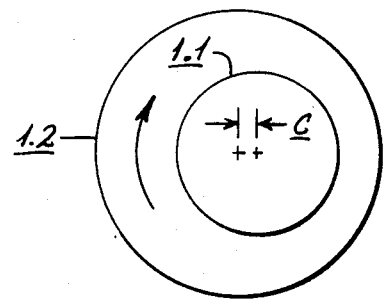
FIG. 3 is a cross-section in the plane of the orbit through elements 1.1 and 1.2 of FIG. 2.

The geometry of the system is shown in the embodiment represented in FIGS. 2 and 3. It should be understood that the machine is represented there in stylized form as an aid to clarity and understanding. Those of ordinary skill in the art would have little difficulty in practicing the invention given such guidance.

Machine frame 1.0 is provided with orbital drive mechanisms 1.4 and 1.5.

In orbital drive mechanism 1.4, a work head 1.1 is the driven element, rotatably confined by driving rotor 1.2. The center of rotation of rotor 1.2 is offset from the axis of work head 1.1 by a distance on the order of about 1 to 15 millimeters (C), depending upon the maximum orbital capacity required of the machine. When the driving rotor 1.2 is rotated, work head 1.1 is driven in an eccentric motion. The work head 1.1 is restrained from rotating by two-axis linear movement mechanism 1.3, so that the eccentric motion without rotation is thus orbital.

Orbital drive mechanism 1.5 corresponds to mechanism 1.4, with work head 1.1A, confined by driving rotor 1.2A, and two-axis linear motion linear 1.3A, all arranged in a mirror image of the corresponding elements of mechanism 1.4, and further adapted to be moved on frame 1.0 toward and away from mechanism 1.4 by means of hydraulic mechanism 1.6.

Alignment of drive mechanisms 1.4 and 1.5 is maintained by linear motion mechanisms mounted on frame 1.0 which carry the moving drive mechanism 1.5 in a manner well known to those of ordinary skill in the art and not shown.

Driving rotors 1.2 and 1.2A are themselves driven by a drive shafts 1.8 and 1.12 via suitable drive means such as belts 1.9 and 1.10. A phase shifting shaft coupling 1.11 provides for indexing and control of the relative angular displacement, as herein defined, of rotors 1.2 and 1.2A, by corresponding changes of the relationship of 1.8 and 1.12. The coupling 1.12 is controlled by the operation of a small motor 1.13.

In operation, the two work heads 1.1 and 1.1A of this embodiment ordinarily will be driven at the same speed by rotation of drive shaft 1.8 by an external source, not shown. In order to change the relative angular displacement, and the resulting orbit size, the drive should be stopped while the change is made. This is a limitation of the particular indexing technique employed, and not a limitation on the present invention.

If real-time variation of the orbits is desired, it is preferred to provide separate drives for rotors 1.2 and 1.2A which can be operated by appropriate differential controls to provide dynamic phase shifting of the angular velocity of the drive mechanism. Such controls are well known to those of ordinary skill in the art.

When the machine is employed as a machine tool, a tool will be mounted on one work head and a workpiece on the other. The tool and workpiece are engaged by raising orbital drive mechanism 1.5 by the operation of the hydraulic mechanism 1.6 and a machining operation is performed by a combination of differential orbiting motions of the tool and workpiece while the operative association is maintained by advancing the elements together.

In appropriate cases, a machining fluid is introduced between the tool and the workpiece. Such techniques are well known to those of ordinary skill and are not shown and require no discussion here. It is worthwhile to note, however, that the mounting of rotating elements can in such cases advantageously be made by use of hydrostatic bearings using the machining fluid and its pumping system to service the bearings. Most machining fluids are suitable for such use, and bearings of such types offer great protection of the machine elements from the debris of the machining operation, as well as serving as excellent bearing designs.

It is also worth noting that there is no specific criticality to having the hydraulic ram at the bottom, and any arrangement which preserves the system geometry is acceptable. The arrangement shown is, however, preferred so that any failure of the hydraulic system results in a prompt and automatic disengagement of the tool and workpiece.

Additionally, linear motion results if the two drive mechanisms are started 180° out of phase and then driven in opposite directions at the same speed. This type relative motion is essential to a number of machining operations.

Figure 4:
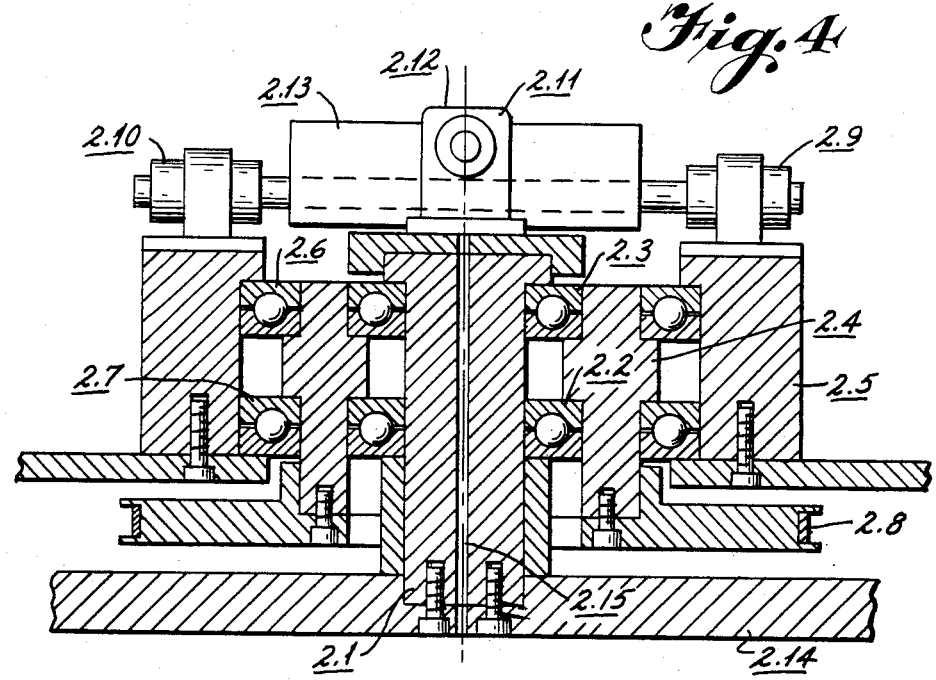
FIG. 4 is an elevation cross-section view of a drive mechanism which is the preferred embodiment and best mode of practicing the invention.

One preferred embodiment is shown in FIG. 4. The workhead spindle, 2.1, is captured and isolated by a pair of angular contact bearings, 2.2 and 2.3. The rotor, 2.4, is also retained to the housing, 2.5, by a pair of angular contact bearings, 2.6 and 2.7. The centers of the workhead spindle and the rotor are displaced by a distance, C. A timing belt pulley, 2.8, is bolted onto the rotor.

Figure 5:
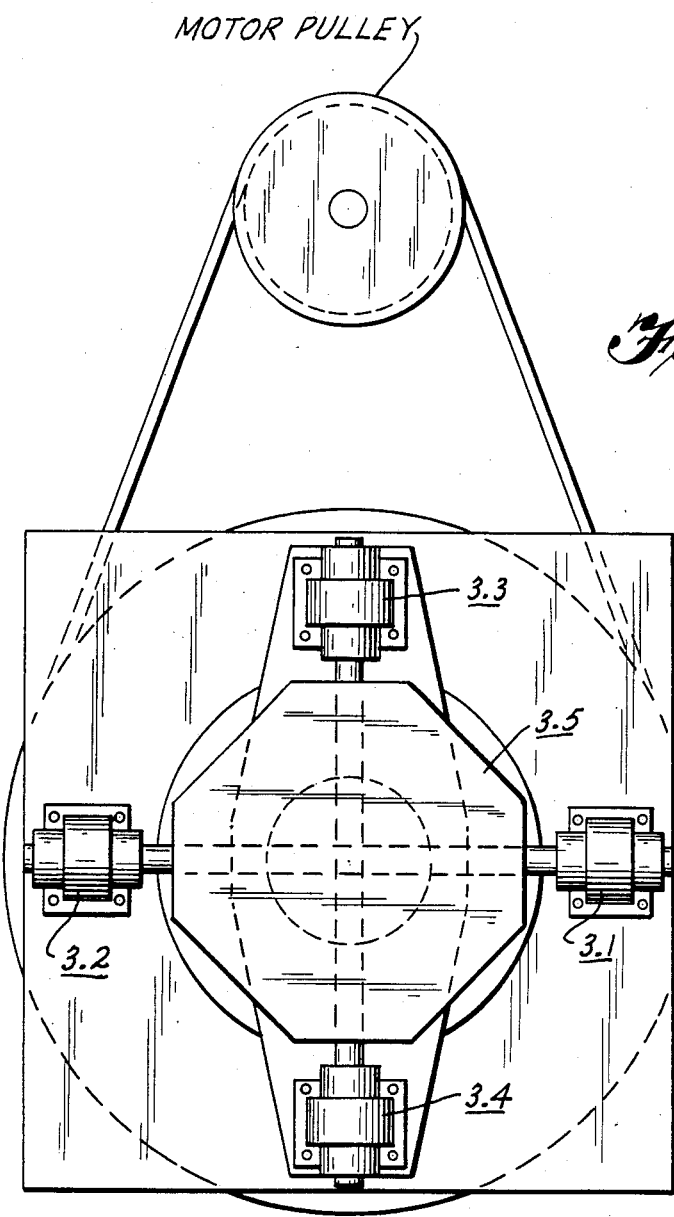
FIG. 5 is a plan view of the embodiment of FIG. 4.

The rotation restraining mechanism is made up of two pairs of linear bearings, 2.9, 2.10, 2.11 and 2.12. It is more obvious in FIG. 5, components 3.1 through 3.4. Accordingly, the center piece, 2.13 in FIG. 4 and 3.5 in FIG. 5, floats on the four linear bearings. Rotation is thus restrained. The workhead will orbit without rotation. Such mechanisms which permit motion in orbital paths or the like in a plane without rotation are well known and conventional in the art and quite familiar to those of ordinary skill.

A work mounting platform, 2.14, is fastened by the workhead shaft, 2.1. A fluid flowing hole, 2.15, provides passage for the pressurized cutting mixture which is essential in the grinding process.

Figure 6:
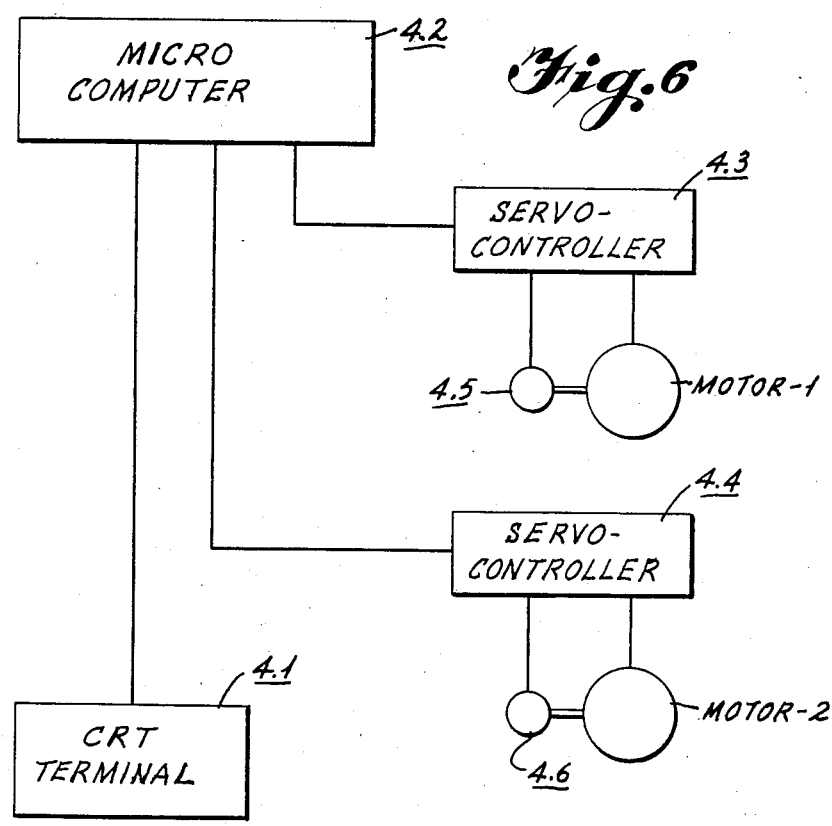
FIG. 6 is a schematic flow diagram of a control system for the operation of the embodiment of FIGS. 4 and 5.

In order to carry out this invention, a microcomputer-based controller is used, shown in FIG. 6. The CRT terminal, 4.1, communicates to the microcomputer, 4.2. According to equations (3) and (4), the angular velocity and the phase difference of the two motors are set and the motions are generated in terms of rotor angles to each other. The external servo-controllers, 4.3 and 4.4, will control the rotor angles in a closed loop mode with a rotor position feedback sensor, 4.5 and 4.6. Thus the motions are duplicated mechanically.

Advantageously, any continuous phase change can be done by the microcomputer according to a set menu stored in the microcomputer.

When the application is limited to the same rotor angular speed, the embodiment will be similar to that shown in FIG. 2, in which case, the rotor motions are mechanically linked and a mechanical shaft phase shifter, which is available commercially, can be implemented. The phase can be adjusted continuously with a geared motor while the shaft is running. The shaft 1.8 is FIG. 2 will be a splined shaft to accommodate the vertical motion of the lower work station. In this design, any malfunction of the cylinder 1.6 due to leakage, etc. will separate the workheads.

What is claimed is:

1. A mechanism for imparting planar relative orbital motion to at least two associated driven elements comprising:
   A. frame means for confining said driven elements;
   B. constraining means for fixing said driven elements to prevent rotation relative to one another;
   C. two opposed eccentric drive means having a common axis of rotation for driving each of said driven elements in a planar orbital path, each of said eccentric drive means having an independently controllable radius of eccentricity to control the radius of each of said orbital paths; and
   D. means for controlling the relative angular displacement of each of said orbital paths relative to the other orbital path of said driven elements by angular adjustment of one of said drive means relative to the other.

2. The mechanism of claim 1, wherein said means to control said relative angular displacement are adapted to maintain a constant relative angular displacement of the orbits of said driven elements.

3. The mechanism of claim 1, wherein said means to control said relative angular displacement are adapted to controllably vary the relative angular displacement of the orbits of said driven elements.

4. The mechanism of claim 1, wherein each of said eccentric drive means has fixed and equal radii of eccentricity.

5. The mechanism of claim 1, wherein said means to control said relative angular displacement are adapted to controllably vary the relative angular displacement of the orbit of said driven elements in a regular pattern.

6. The mechanism of claim 5, wherein said regular pattern produces a resultant elliptical motion.

7. The mechanism of claim 5, wherein said regular pattern produces a resultant circular motion.

8. The mechanism of claim 5, wherein said regular pattern produces a resultant linear motion.

9. The mechanism of claim 1, wherein at least one of said driven elements is a tool and at least one of said driven elements is a workpiece and wherein said relative orbital motion causes said tool to perform work upon said workpiece.

10. The mechanism of claim 9, wherein said tool is an abrasive tool and said work is abrasion.

* * * * *